(12) United States Patent
Boulanger et al.

(10) Patent No.: US 7,669,240 B2
(45) Date of Patent: Feb. 23, 2010

(54) APPARATUS, METHOD AND PROGRAM TO DETECT AND CONTROL DELETERIOUS CODE (VIRUS) IN COMPUTER NETWORK

(75) Inventors: Alan David Boulanger, Amherst, MA (US); Robert William Danford, Boulder, CO (US); Kevin David Himberger, Raleigh, NC (US); Clark Debs Jeffries, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 945 days.

(21) Appl. No.: 10/896,680

(22) Filed: Jul. 22, 2004

(65) Prior Publication Data

US 2006/0021040 A1    Jan. 26, 2006

(51) Int. Cl.
*H04L 29/02* (2006.01)
*H04L 29/08* (2006.01)
(52) U.S. Cl. .............................. 726/22; 726/13; 726/24
(58) Field of Classification Search .............. 726/22–25
See application file for complete search history.

(56) References Cited

U.S. PATENT DOCUMENTS

| | | | |
|---|---|---|---|
| 5,550,984 A | 8/1996 | Gelb | |
| 5,946,679 A * | 8/1999 | Ahuja et al. .................... | 707/3 |
| 5,987,611 A | 11/1999 | Freund | |
| 6,128,296 A * | 10/2000 | Daruwalla et al. .......... | 370/389 |
| 6,141,749 A | 10/2000 | Coss et al. | |
| 6,272,640 B1 * | 8/2001 | Sokol .......................... | 726/23 |
| 6,510,154 B1 | 1/2003 | Mayes et al. | |
| 2002/0016826 A1 * | 2/2002 | Johansson et al. ........... | 709/207 |
| 2002/0035698 A1 | 3/2002 | Malan et al. | |
| 2002/0038339 A1 | 3/2002 | Xu | |
| 2002/0083344 A1 | 6/2002 | Vairavan | |
| 2002/0133586 A1 * | 9/2002 | Shanklin et al. ............. | 709/224 |
| 2002/0162026 A1 | 10/2002 | Neuman et al. | |
| 2002/0184362 A1 | 12/2002 | Banerjee et al. | |
| 2003/0061510 A1 | 3/2003 | Hartmann et al. | |
| 2004/0199535 A1 * | 10/2004 | Zuk ........................... | 707/102 |
| 2005/0213570 A1 * | 9/2005 | Stacy et al. .................. | 370/389 |

OTHER PUBLICATIONS

J. Pikoulas, et al., "An Intelligent Agent Security Intrusion System", Proceedings Ninth Annual IEEE International Conference and Workshop on the Engineering of Computer Based Systems, p. 94-9, 2002, INSPEC Abstract.
H. Saito, et al, "Development of Real-Time Simulator Using Traffic Monitoring", 2000 IEEE International Conference on communications, ICC 2000. Global convergence through Communications; Conference Record, Part vol. 1, p. 195-9, Jun. 18-22, 2000 INSPEC Abstract.

* cited by examiner

*Primary Examiner*—Jung Kim
*Assistant Examiner*—Venkat Perungavoor
(74) *Attorney, Agent, or Firm*—Dillon & Yudell LLP (57) ABSTRACT

A detection and response system including a set of algorithms for detection within a stream of normal computer traffic a subset of TCP packets with one IP Source Address (SA), one Destination Port (DP), and a number exceeding a threshold of distinct Destination Addresses (DA). There is efficient use of a lookup mechanism such as a Direct Table and Patricia search tree to record sets of packets with one SA and one DP as well as the set of DA values observed for the given SA, DP combination. The existence of such a subset and the header values including SA, DP, and multiple DAs of the subset are reported to a network administrator. In addition, various administrative responses to reports are provided.

4 Claims, 11 Drawing Sheets

APPARATUS, METHOD AND PROGRAM TO DETECT AND CONTROL DELETERIOUS CODE (VIRUS) IN COMPUTER NETWORK

CROSS REFERENCE TO RELATED PATENT APPLICATIONS AND PATENT

U.S. patent application Ser. No. 10/629,175 filed Jul. 29, 2003, entitled "METHOD, PROGRAM AND SYSTEM FOR AUTOMATICALLY DETECTING MALICIOUS COMPUTER NETWORK RECONNAISSANCE";

U.S. patent application Ser. No. 10/896,733 entitled "METHOD, SYSTEM AND PROGRAM FOR AUTOMATICALLY DETECTING DISTRIBUTED PORT SCANS IN COMPUTER NETWORKS";

U.S. Pat. No. 6,404,752 entitled "NETWORK SWITCH USING NETWORK PROCESSOR AND METHODS"—assigned to the assignee of the present invention—describes a network processor on which the present invention can be implemented. The patent is incorporated in its entirety herein.

BACKGROUND OF THE INVENTION

1. Field of the Invention

The present invention relates to computer networks in general and in particular to protecting said networks against malicious traffic.

2. Prior Art

Open access to public networks, such as the Internet, has made it easier for hackers to launch or disseminate harmful code known as worm, virus, etc. Because most private networks are coupled to the Internet viruses launched from public networks can affect not only devices connected to the public network but also devices connected to the private networks. With the advent of e-business and stock market activities, it is well known that large amounts of business transactions are consummated via computer networks. As a consequence a malicious person wishing to cause economic chaos could launch a virus from a public site to disrupt these transactions.

The prior art has recognized the need and has provided tools to be used on said computer networks to detect malicious viruses. For the most part these tools work well for their intended purpose. Stated another way the tools work well to detect the virus for which it was created to detect. If the characteristics of the virus change the tool may be worthless and not able to detect the new virus. It is well known that hackers are very intelligent individuals and are most likely to change virus characteristics to prevent detection.

In view of the above, prior art techniques which are primarily based upon comparison between a library of patterns in the tool and virus in a packet do not give a network administrator sufficient power and control to protect a computer network against malicious viruses. As a consequence a tool is required that does not protect computer network based upon virus pattern but on other characteristics or statistics of the packets sent maliciously. By so doing hackers may change the virus pattern at will. Yet still such malicious packets will still be detected.

SUMMARY OF THE INVENTION

The detection system of the present invention includes a computer such as a Network Processor, in which a construct comprising of a Direct Table and Patricia trees are provided in memory. Algorithms are provided to monitor selected network traffic, maintain the construct and correlate keys from the select network traffic with the construct so that Transmission Control Protocol (TCP) Synchronize (SYN) packets having one Source Address (SA), one Destination Port (DP) and many Destination Addresses (DAs) are identified and reported as malicious packets.

In one embodiment the present invention first compares the raw DP (16 bits) to a relatively short list of well-known DP values that are specified by the administrator. The list could include, for example, port 80, the HyperText Transfer Protocol (HTTP) port since it is normal during web surfing to create traffic from one SA to many DAs all with DP=80. If the packet is in the list, it is not considered further as a potential malicious packet by the present invention. In a preferred embodiment, testing for such permissive DP values can be done in datapath software. That is, a small lookup table may be included in the program that processes packets in a programmable processor such as a network processor. The small lookup table would be suitable for testing packet DP membership in a small list of permissive DPs (such as 10 permissive DPs). Another example of a permissive DP in some cases would be 25, the number designating Simple Mail Transfer Protocol (SMTP).

In another embodiment, the invention would automatically drop packets with illegal settings of header bits or illegal sequences of legal settings, for example, a TCP packet with both SYN and Finish (FIN) bits equal to one or a TCP packet with both SYN and Acknowledgment (ACK) bits set with no corresponding SYN packet having been recorded. Also in a preferred embodiment, the invention would delete lookup entries corresponding to one SA and one or more DAs when a FIN or FIN/ACK packet in the session or sessions is seen.

From a more general perspective the present invention sniffs and detects malicious packets launched under guise of TCP packets used in TCP session. There are many ways in which a malicious person may elect to disrupt computer network traffic. One way would be for the malicious person to disseminate a worm or virus in the payload of a Transmission Control Protocol (TCP) session. This could discover vulnerable machines for immediate or later infection.

The dissemination could be a TCP session sent from one IP Source Address (SA) (the attacker) to a vulnerable Destination Port (DP) number and several IP Destination Addresses (DAs) (possibly random, sequential, or in a set of DAs thought to be potential addresses of victims). The present invention enables detection of the set of many such SYN packets that would comprise such malicious traffic, all within much larger set of normal traffic. Also, the present invention includes several possible responses to such a detection.

That is, the present invention includes an efficient search strategy and algorithm for the detection within high bandwidth traffic of a subset of Synchronize (SYN) packets with one SA, one DP, and many DA values. Some attacks might be purposefully slow, about one to ten packets per second, to avoid notice by anomaly detectors. Slow dissemination rates are in the problem described and addressed by the present invention. The malicious traffic might be reconnaissance to discover the identity of target machines that support certain applications. Alternatively, the malicious traffic might include a payload that is in itself a virus or worm capable of reconnaissance or gaining unauthorized control of a processor leading to unauthorized access to files, deletion of files, modification of files, or copying of files. Any such SYN traffic is called in this invention an exploit.

A programmable processor in a network such as a network processor may include Full Match (FM) lookups. A long key may be read from a TCP packet such as the 104-bit IP five-tuple consisting of SA, DA, Source Port (SP), DP, and Protocol number (=6 for TCP). Alternatively, a longer key, up to approximately 192 bits, with the IP five-tuple and other header value may be used. The key is hashed to a convenient size, say, 16 bits. For a 16-bit index there would be a Direct Table (DT) with 64K slots. Each slot that stores a memory could point to exactly one leaf or could point to a tree with one or more branches and some leaves. In the tree some additional bits in the raw key are checked until at most one match remains possible (a leaf). When a leaf is reached by any means, the full key is compared to the full leaf key pattern [with 0, 1, or * (don't care) entries, or high and low range entries], and there is either a hit (that leads to an associated action also recorded in the leaf) or a miss (that leads to a default action).

The present invention makes use of FM lookups in a new manner. The goal is not to recognize a particular packet using known parameters and then to apply an action. Rather, there are no known parameters. The goal is to recognize statistical behavior by a set packets with hitherto unknown header bit combinations. This might be called behavior recognition as opposed to conventional packet recognition. The behavior recognition problem addressed by this invention consists of recognizing the fact that a set of SYN packets with one SA, one DP, and many DAs exists within a much larger set of packets. The invention includes recognition and also reporting of the common SA and DP. In alternative embodiments, more than one SA or more than one DP, up to small limits such as two or ten, can be also recognized and reported.

To solve the behavior recognition problem, the input key for the invention is defined to be the concatenation of SA and DP of every TCP packet.

In an alternative embodiment, the present invention could be permissive of no DP values.

To solve the behavior recognition problem, an input key used by the invention is defined to be the concatenation of TCP Source Address (SA) and Destination Port (DP). This value SA, DP is fed as a key to a search engine incorporating a Patricia tree.

If the packet does not have a permissive DP as above, then the present invention hashes the concatenation of the SA and DP (48 bits) to a convenient image (such as 16 bits) in a Direct Table (DT). SA, DP bits must be taken in bit test branches of a tree until we reach a leaf associated with at most one previously seen SA, DP. Each leaf is defined by an SA, DP combination. Each leaf also contains at least one and possibly more DA values.

Two kinds of collisions can occur (packets with different header values having the same hash value in the DT). First, dissemination of malicious traffic can result in packets with the same SA and DP, but several different DAs. Since only SA, DP are inputs to the hash, such hashes will collide. Second, by chance the hash of two unrelated SA, DP combinations can be the same. In the second case, further tests of SA, DP bits must be taken in bit test branches of a tree until we reach a leaf associated with at most one previously seen SA, DP combination. Thus each leaf is defined by one SA, DP combination. Each leaf also contains at least one and possibly more DA values.

DETAILED DESCRIPTION OF AN EMBODIMENT OF THE INVENTION

Computer network administration includes defending network assets from malicious traffic. The dissemination of malicious traffic in some cases entails a set of packets with one Source Address (SA) corresponding to the attacker, one Destination Port (DP) corresponding to an application thought to be vulnerable by the attacker, and many Destination Addresses (DAs) corresponding to possible victims. In other cases, a few SAs and DPs could be involved, but still many more DAs.

The administrator relies on tools, such as the one disclosed in the present invention, to assist in defending the network. As part of network defense, an administrator may wish to detect such sets of packets as they pass through a switch, router, Network Interface Card (NIC), or, more generally, a machine capable of classifying, switching. routing, policing functions, or other security functions based upon classification results.

Figure 1:
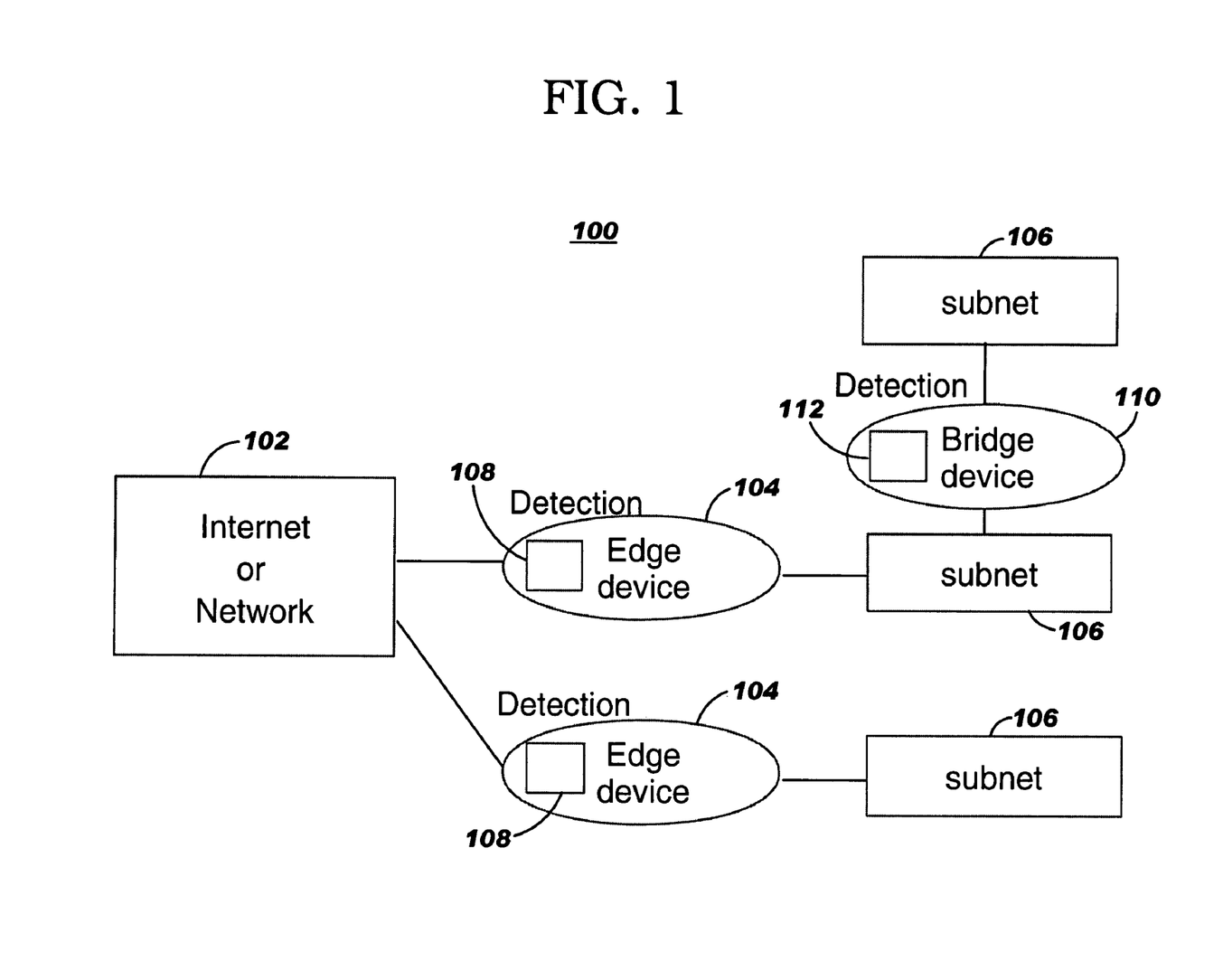
FIG. 1 shows high level components of a network and in particular some potential logical locations of the present invention as detection mechanism.

FIG. 1 shows a highly simplified network 100 with components. The Internet or other network 102 connects to Edge devices 104. Each edge device might or might not contain an instance of the invention 108. Edge devices also connect subnets 106. In turn, two subnets might be connected by a Bridge device 110. A Bridge device might or might not contain an instance of the present invention 112. Because Edge devices and Bridge devices are well known in the prior art, only those portions that include the teachings of the present invention or are necessary to understand the present invention will be discussed herein.

Figure 2:
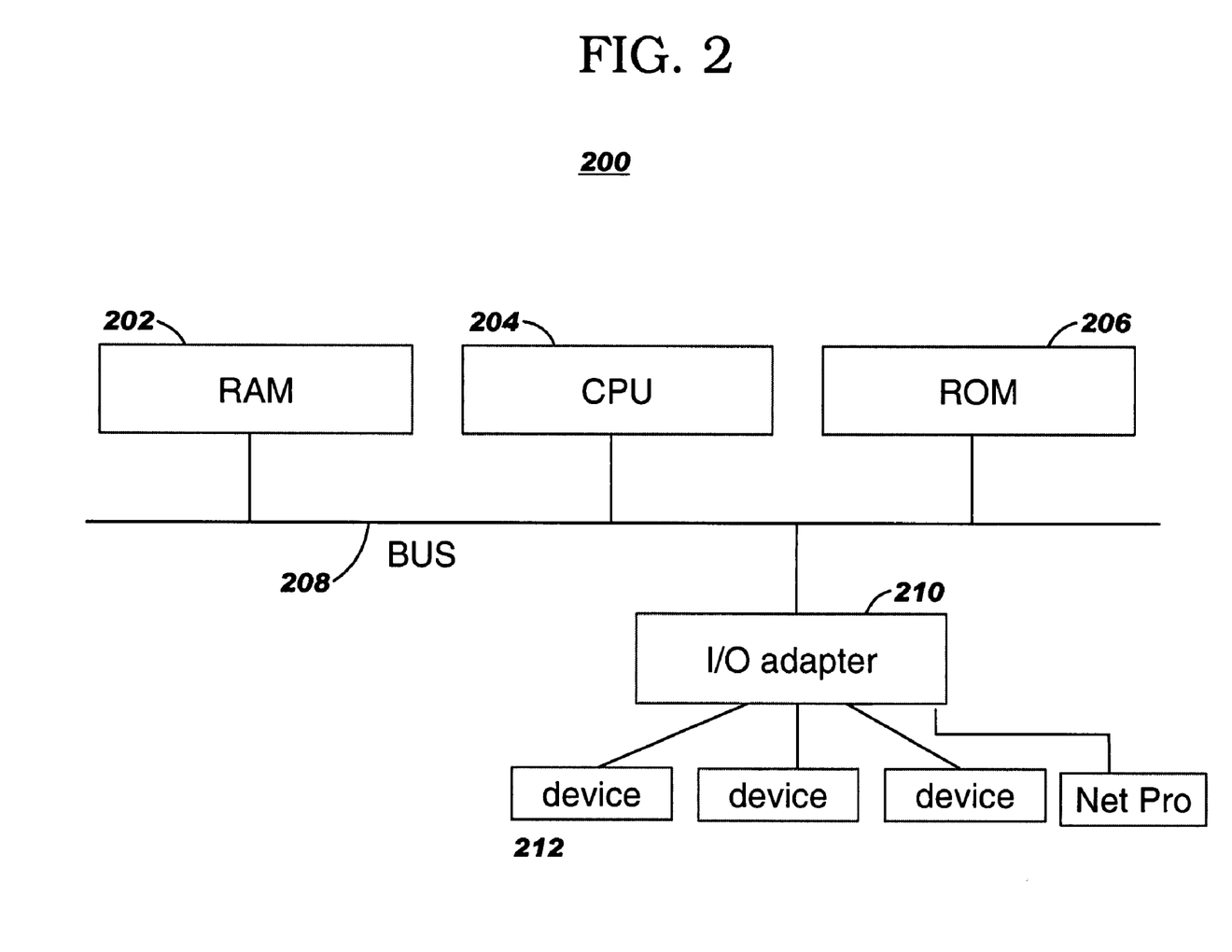
FIG. 2 shows high level components of hardware and in particular some potential logical locations of the components needed to enable the present invention.

Referring to FIG. 2 components 200, representing an instance of the invention, within an Edge device or Bridge device are shown. Random Access Memory (RAM) 202 stores updates of information as included in the present invention. A Central Processing Unit (CPU) 204 has access to data stored at configuration in Read Only Memory (ROM) 206 to implement the algorithms of the present invention and thereby update RAM. A Bus 208 is provided for communication of signals among the components. An Input/Out put (I/O) adapter 210 manages signaling to and from external devices 212 that might include a general purpose computer with monitor observed periodically by a human administrator.

Figure 3:
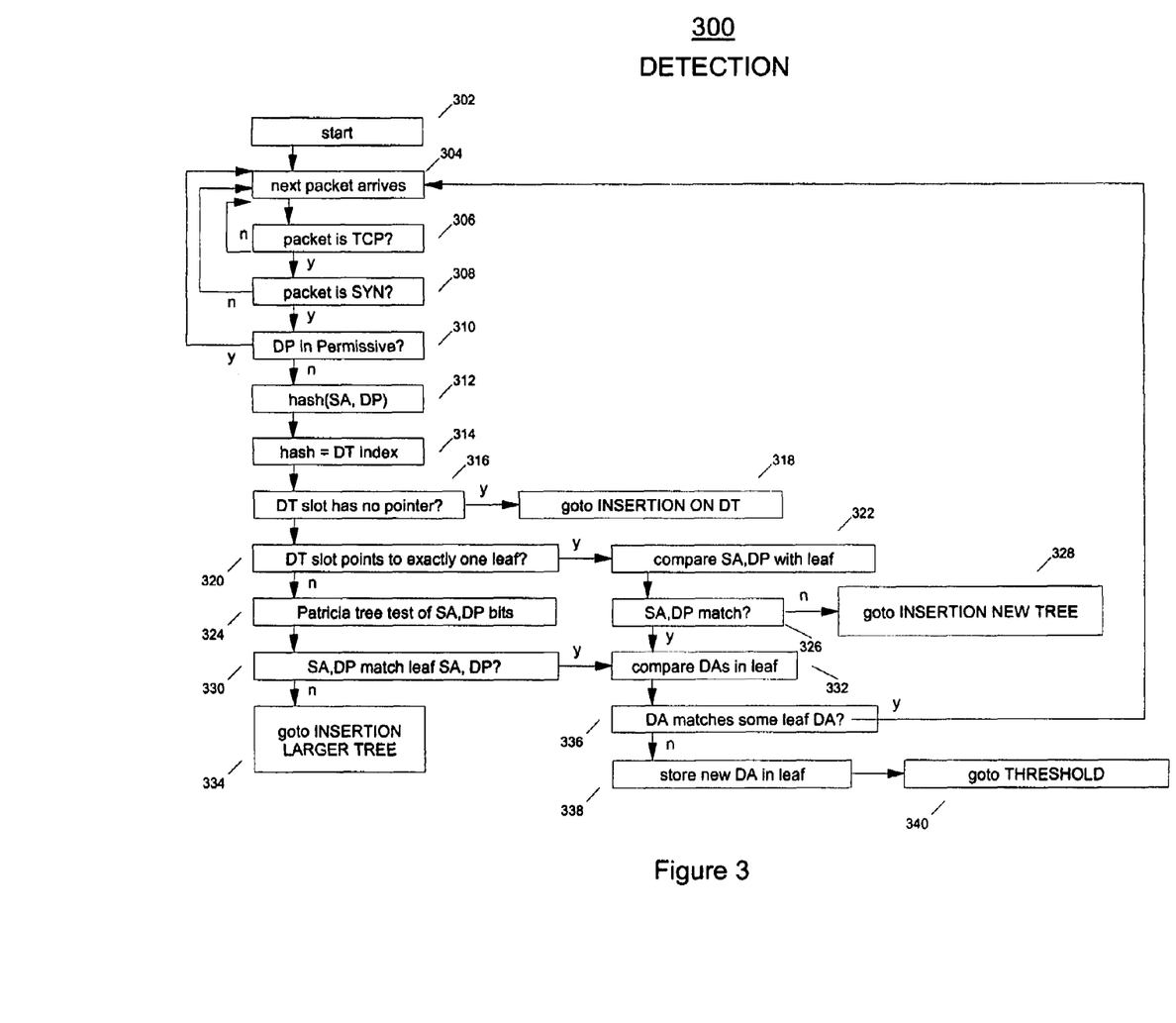
FIG. 3 shows a flowchart for the detection portion of the present invention.
Figure 4:
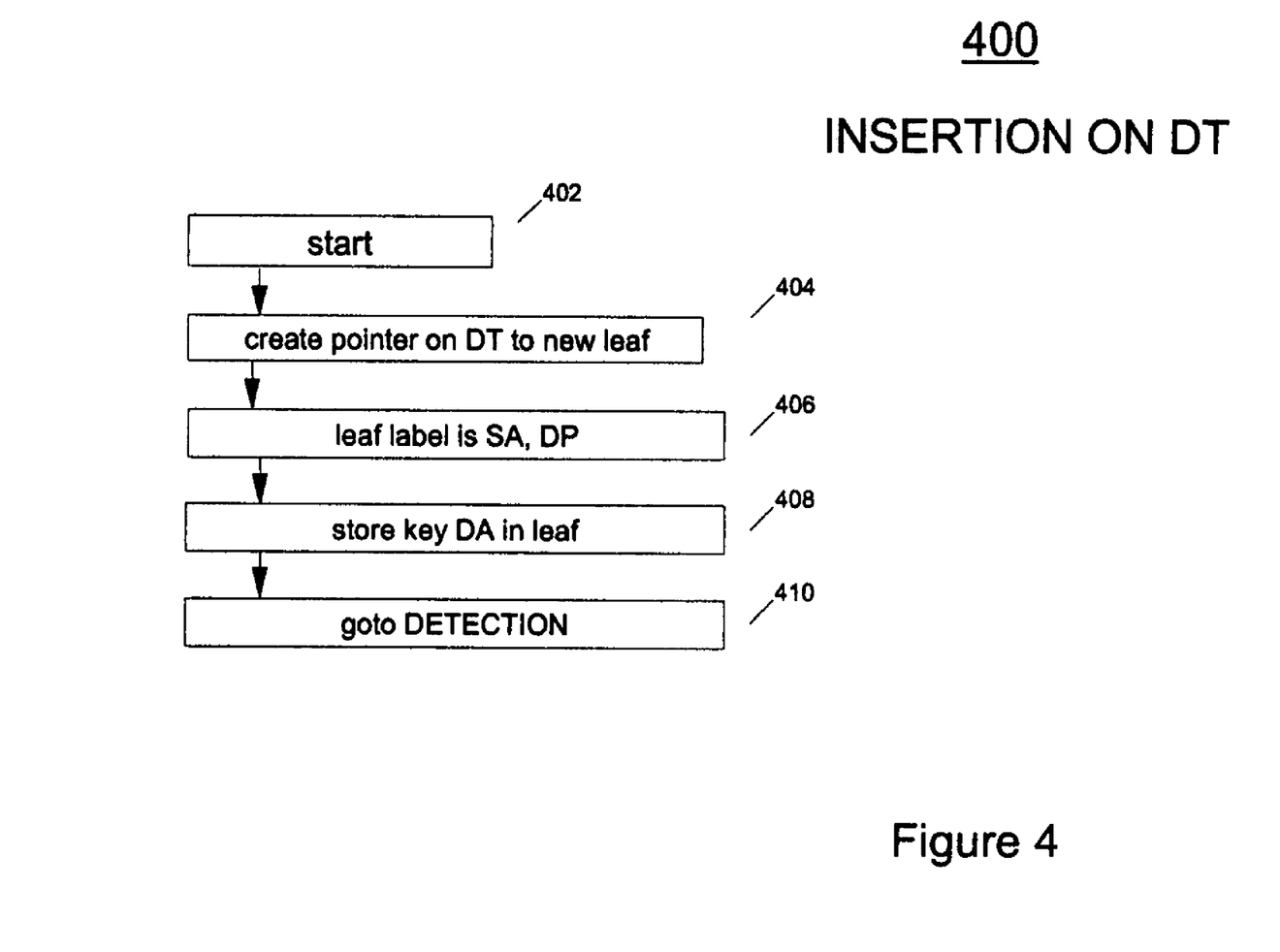
FIG. 4 shows a flowchart for portion of the present invention that pertains to the insertion of a new pointer and new leaf in the Direct Table (DT).

Referring to FIG. 3 a flowchart 300 is shown for the DETECTION algorithm according to the teachings of the present invention. The start 302 of the algorithm is followed by the arrival of the next packet 304. The Internet Protocol (IP) packet is tested 306 for being TCP. The test is effectuated by examining control bits in the IP header. If it is not, the algorithm returns to state 304 to await the next packet. If the packet is TCP, then the packet is tested 308 for being SYN. The test is carried out by examining control bits in the TCP header. If it is not, then the algorithm returns to 304. If it is SYN, then the DP in the TCP header is tested 310 for membership in the Permissive list. If it is the Permissive list, then the algorithm returns to 304. If the DP is not Permissive, then the concatenation of SA and DP is fed 312 to a hash function. The value of the hash becomes the index into a Direct Table (DT) 314. The DT slot is tested 316 for already having a pointer to a leaf or to a tree with at least two leaves. If there is no pointer, then the algorithm branches 318 to the INSERTION ON DT algorithm (FIG. 4). If there is a pointer, then the algorithm tests for pointing to exactly one leaf 320. If the pointer is to a tree with at least two leaves, then the SA, DP concatenation is tested 324 by the Patricia tree algorithm. The SA, DP key is then tested 330 by the Patricia tree algorithm to try to match the label of an existing leaf. If SA, DP does not match, then the algorithm branches 334 to the INSERTION LARGER TREE algorithm. If SA, DP does match a leaf in the tree, then the DA of the key is compared 332 to the one or more DA values in the leaf. Going again to 320, if the DT slot points to exactly one leaf, then the algorithm compares 322 the key SA, DP with the label of that leaf. If the SA, DP do not match 326, then the algorithm branches to INSERTION NEW TREE 328. If the SA, DP do match 326, then the algorithm branches to a comparison 332 of the DA of the key with the one or more DA values in the leaf. If the key DA matches some leaf DA 336, then the algorithm returns to 304 to await the next packet. If the key DA does not match any leaf DA, then the new DA is stored 338 in the leaf. The algorithm then goes 340 to the THRESHOLD algorithm.

Referring to FIG. 4 a flowchart 400 is shown for the INSERTION algorithm included in the invention. The start 402 of the algorithm is followed by the creation 404 of a new pointer from the Direct Table (DT) slot to a new leaf. The leaf is labeled 406 with the concatenation of SA and DP. The leaf is used to store the value of the DA in the packet IP header 408. Then the algorithm branches 410 to DETECTION previously described with reference to FIG. 3.

Figure 5:
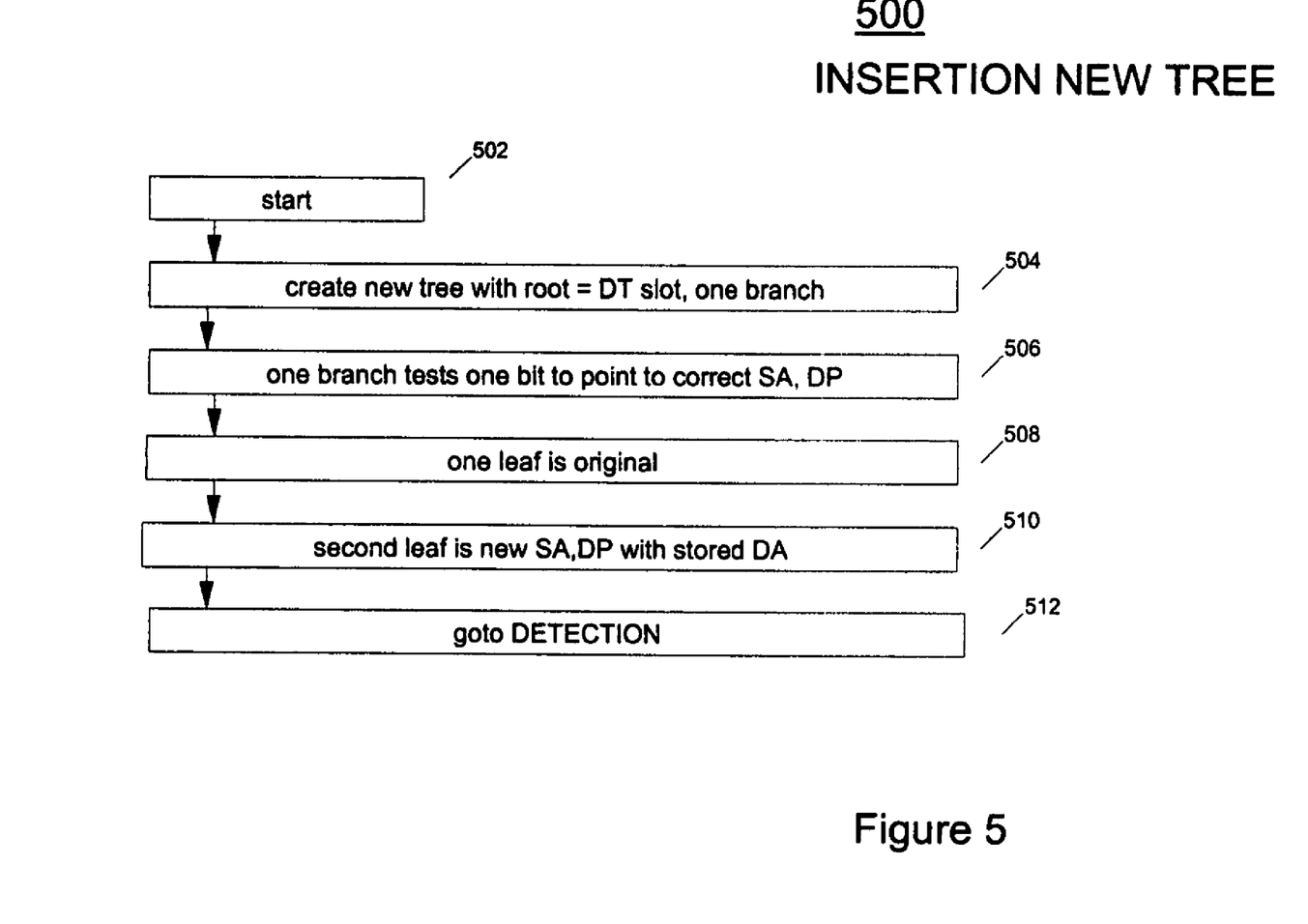
FIG. 5 shows a flowchart for portion of the present invention that pertains to the insertion of a new Patricia tree in the Direct Table (DT).

Referring to FIG. 5 a flowchart 500 is shown for the INSERTION NEW TREE algorithm included in the invention. This algorithm covers the case that one original leaf is already attached to the DT slot and a second leaf with different SA, DP value but the same hash value is to be added. The start 502 of the algorithm is followed by creation of a new tree 504 with root equal to the DT slot. One branch is attached 506 to the root. Two SA, DP value hash to this same slot. In the manner of the well-known Patricia tree algorithm, the first bit is found 508 in which the two SA, DP labels differ. One value of the test bit at the branch points to the original leaf block 508. The other possible value of the same bit points to the newly added leaf block 510. The newly added leaf has its SA, DP as label and stores block 510—the DA of the new key. Then the algorithm branches to DETECTION Block 512.

Figure 6:
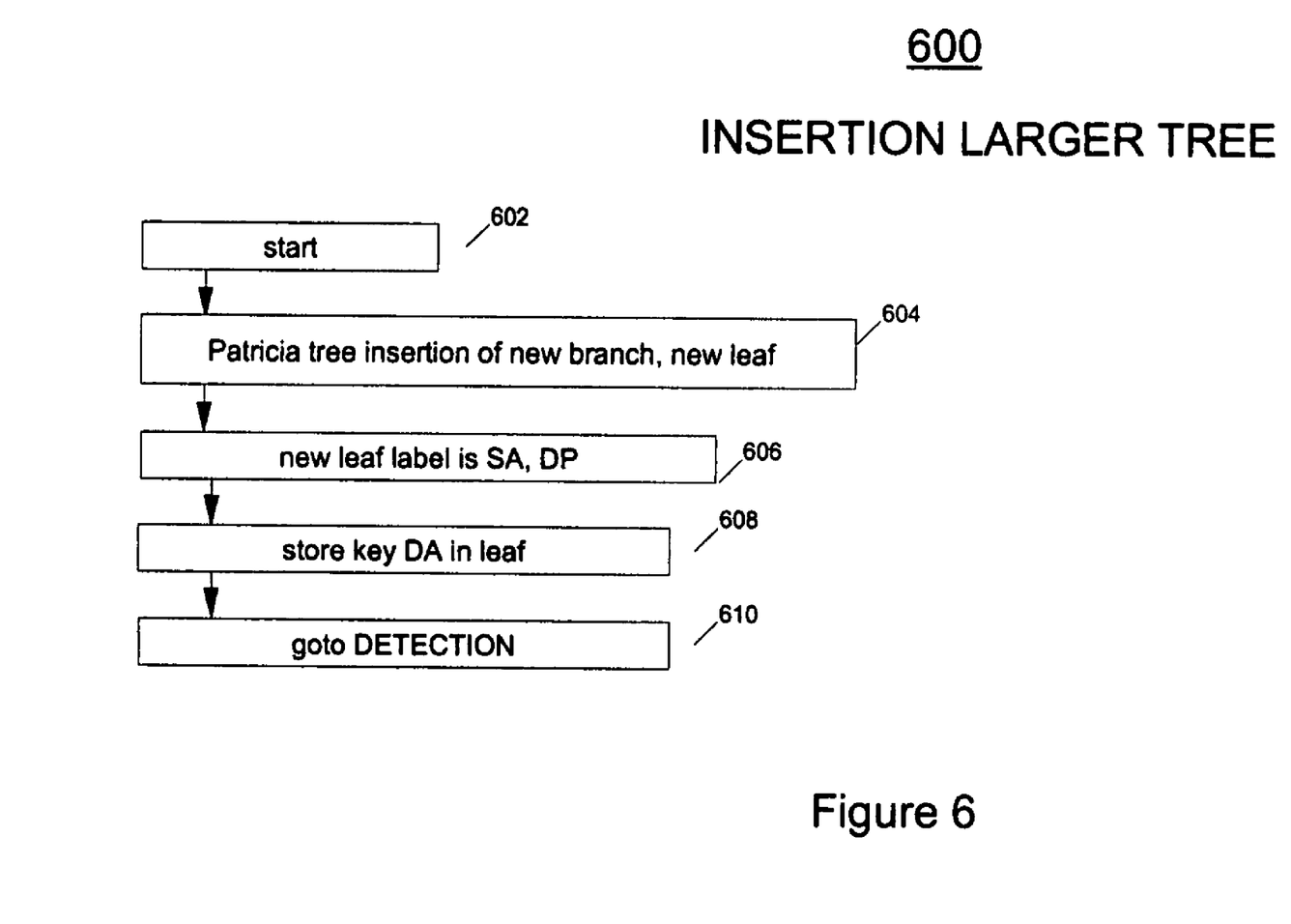
FIG. 6 shows a flowchart for portion of the present invention that pertains to the insertion of a new leaf and new branch within a larger Patricia tree in the Direct Table (DT).

Referring to FIG. 6 a flowchart 600 is shown for the INSERTION LARGER TREE algorithm included in the invention. The start 602 of the algorithm is followed by well-known Patricia tree insertion 604 of a new branch and a new leaf. The label of the new leaf is designated as the concatenation of the SA, DP of the key block 606. The DA of the packet is stored in the new leaf block 608. Then the algorithm branches to DETECTION block 610.

Figure 7:
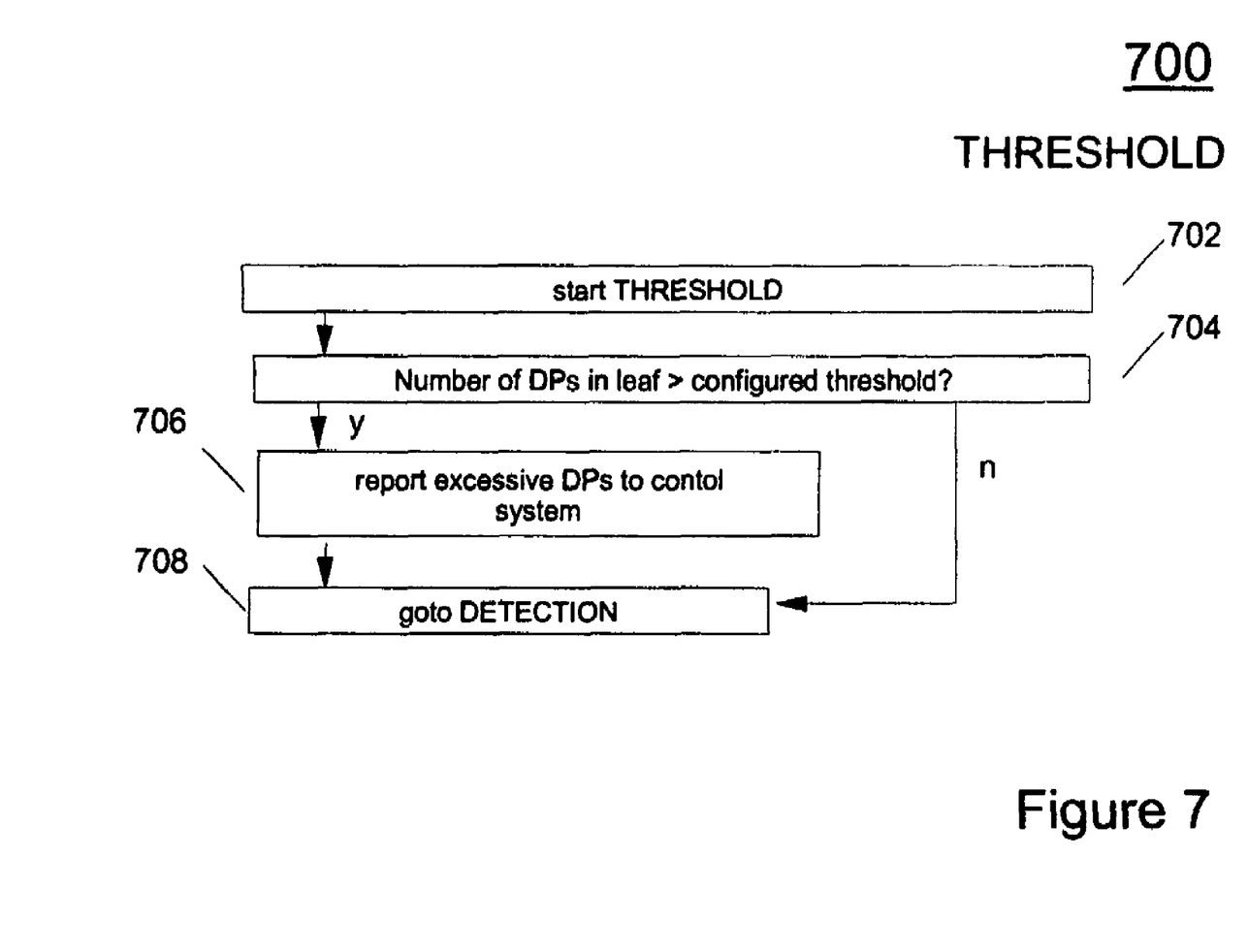
FIG. 7 shows a flowchart for comparing the number of distinct Destination Addresses (DA) in a leaf to a threshold, a portion of the present invention.

Referring to FIG. 7 a flowchart 700 is shown for the THRESHOLD algorithm included in the invention. The start 702 of the algorithm is followed by comparing block 704 the number of DA values stored in the leaf to a threshold specified at configuration, typically eight. If the number of (distinct) DA values is less than or equal to the threshold, then the algorithm branches block 708 to DETECTION. If the number of DA values is greater than the threshold, then a report is sent block 706 to the administrator or administration system. Then the algorithm branches block 708 to DETECTION.

Figure 8:
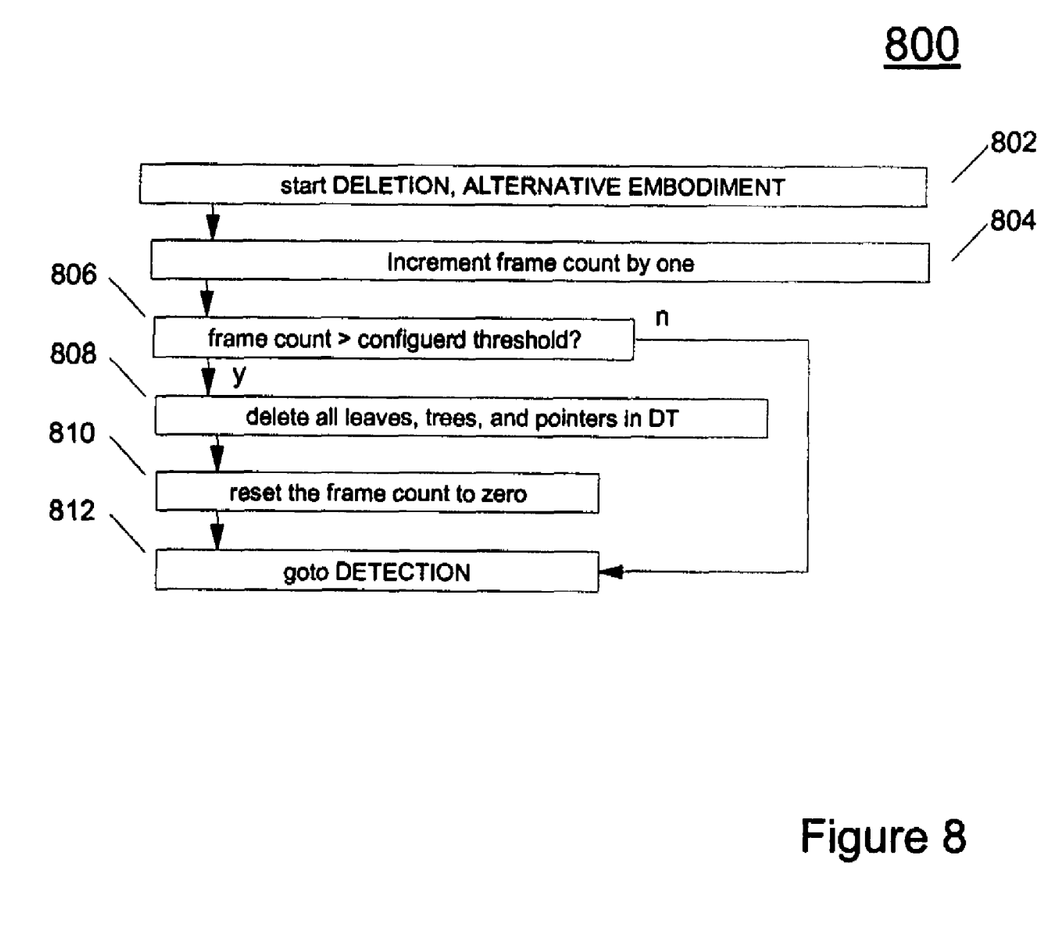
FIG. 8 shows a flowchart for the periodic deletion of all leaves, trees, and pointers to reset the detection apparatus, a portion of the present invention.

Referring to FIG. 8 a flowchart 800 is shown for the DELETION algorithm included in the invention. The start 802 of the algorithm is followed by incrementing block 804 the frame count value by one. Then the frame count is compared 806 to a threshold number of frames such as 1024 block 806. If the frame count is not greater than the threshold, then the algorithm branches to DETECTION block 812. If the frame counts is less than or equal to the threshold, then the algorithm causes the complete deletion of all leaves, trees (branches), and DT pointers block 808. The algorithm next resets the value of frame count to zero block 810. Then the algorithm branches 812 to DETECTION. In an alternative embodiment, the count used could be time increments, not number of frames. Those practiced in the art will understand this alternative is a simple change in the DELETION algorithm.

Figure 9:
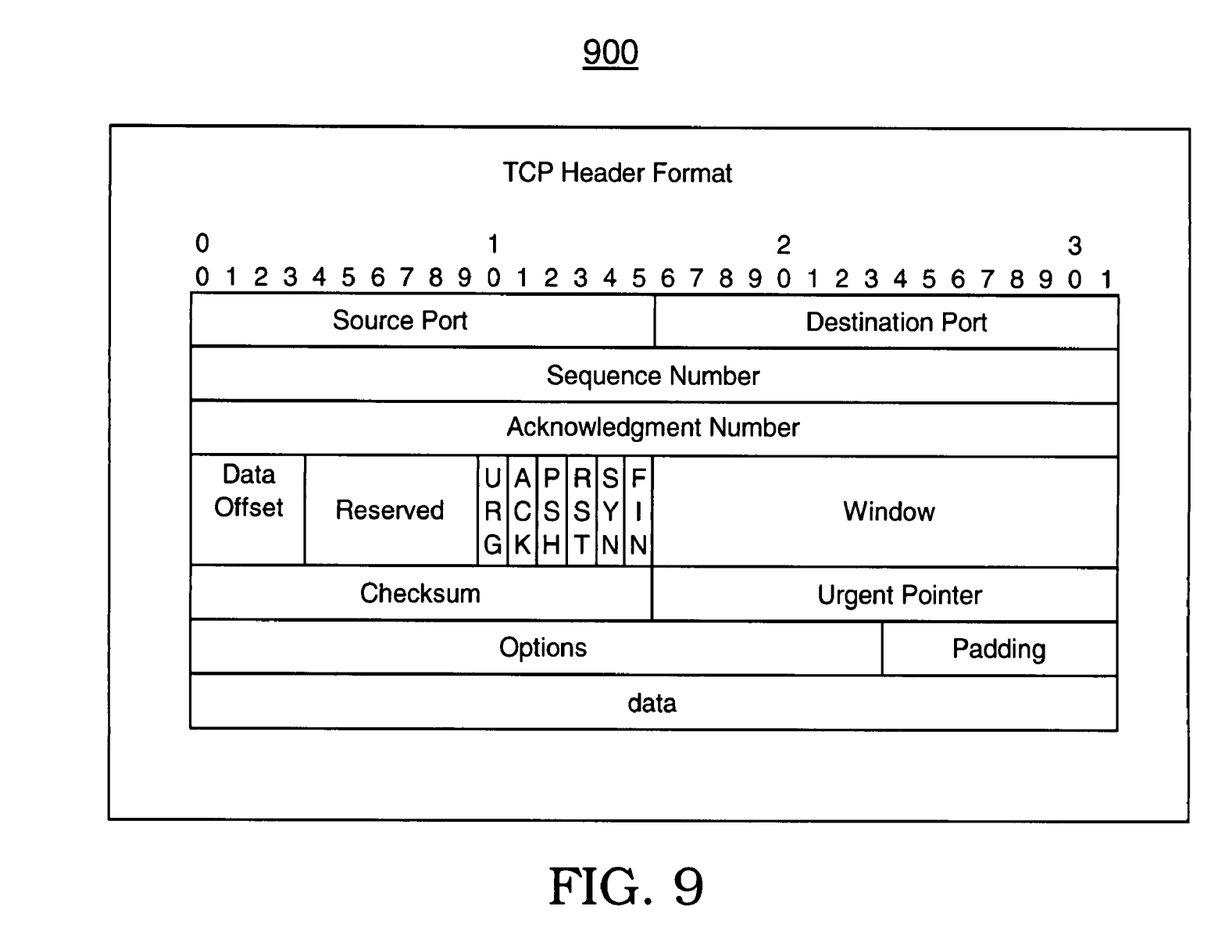
FIG. 9 shows a graphical representation of the Transmission Control Protocol (TCP).

FIG. 9 shows a graphical representation of the Transmission Control Protocol (TCP) Header Format which is nested in the payload field of the IP datagram. The TCP Header Format is also well known in the prior art. Therefore, only the fields and bits which are of interest to the present invention will be discussed further. The fields of interest include Source Port (SP) and Destination Port (DP). As is known to those skilled in the art the SP identifies origination port of a packet, whereas DP identifies end port to which packet is to be delivered. The bits of interest include Reset (RST) and Synchronize (SYN). These bits when set are active and when reset are inactive. The packet identified is determined by setting of the bits. For example if the SYN bit is set, this would indicate a SYN packet. The use and function of these bits are well documented in the prior art. Therefore, further discussion is not warranted.

Figure 10:
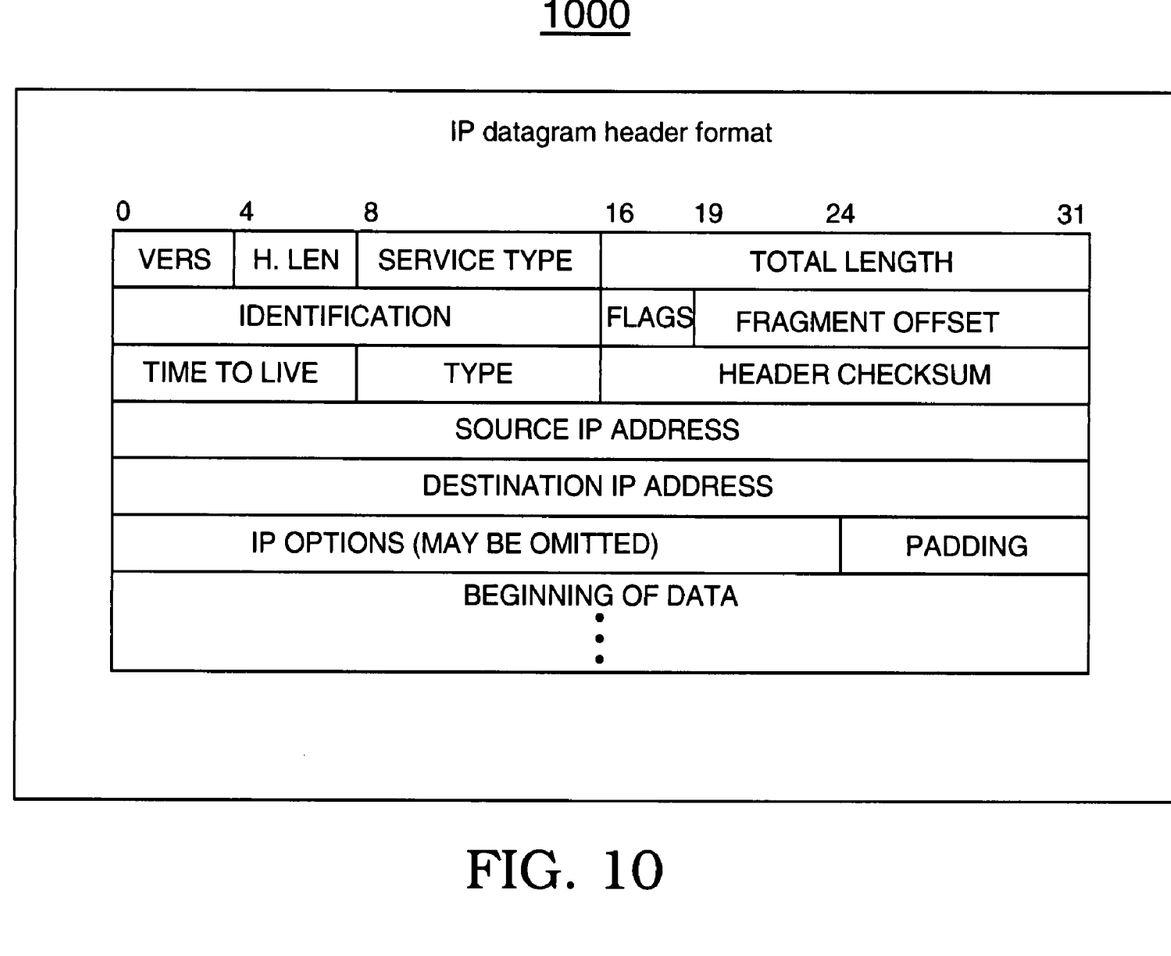
FIG. 10 shows flowchart or graphical representation of Internet Protocol (IP).

FIG. 10 shows a graphical representation of the Internet Protocol (IP) datagram header format. Because this IP datagram header format is well known in the prior art only fields of the header that are relevant to the present invention will be identified and discussed. The fields of interest are the Source IP Address (SA) and Destination IP Address (DA). The DA identifies the origin of the datagram (packet) whereas SA identifies the end (destination) of said packet.

Figure 11:
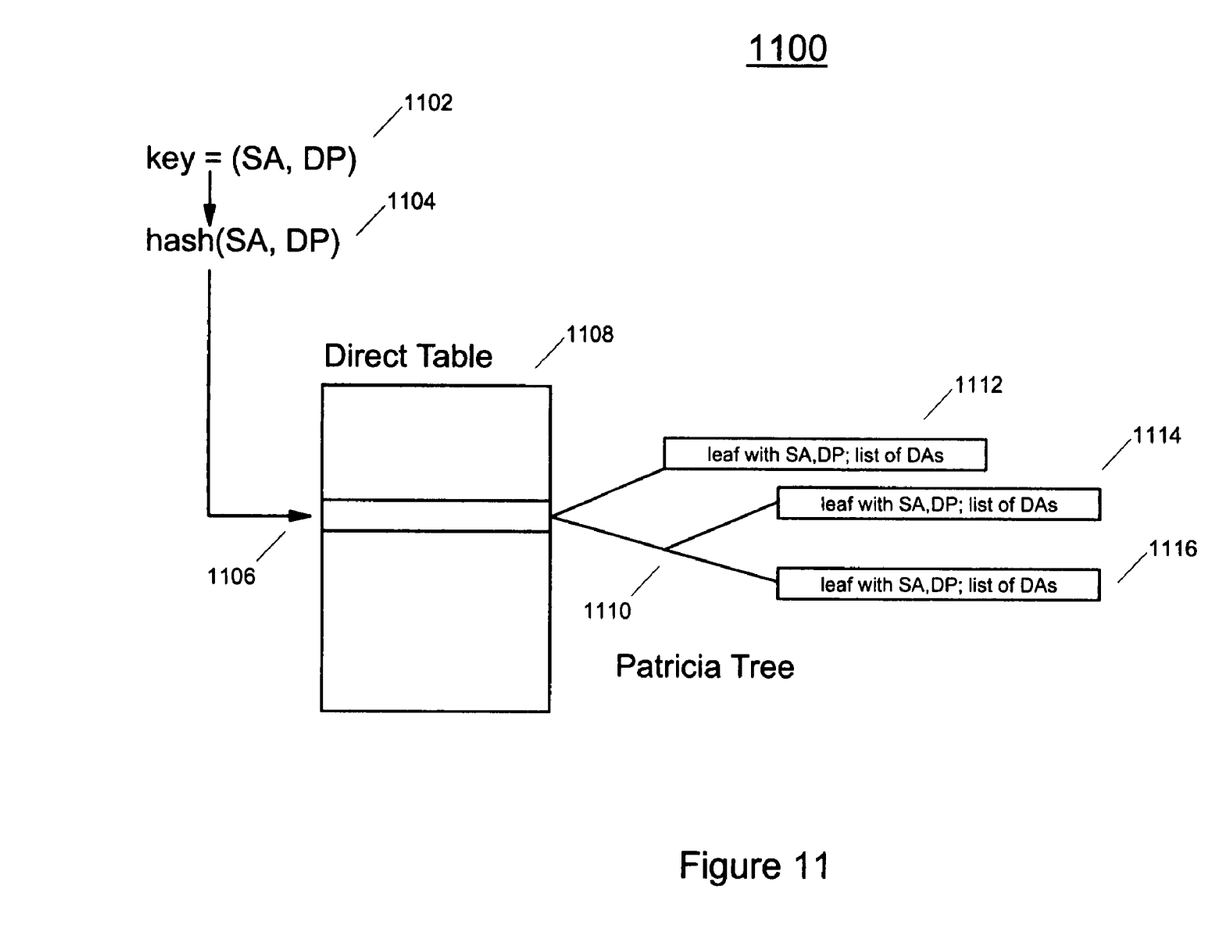
FIG. 11 shows a graphical representation of the look-up data structure according to teachings of the present invention.

FIG. 11 shows a graphical representation of a data structure against which the SA and DA of a TCP/IP SYN packet is correlated in order to determine if it is a malicious packet.

The data structure 1100 includes the extraction of the key 1102 composed of the concatenation of SA and DP, so 48 bits. It further includes applying a hash function 1104 to produce a shorter index such as 16 bits. The index is used relative to a Direct Table 1108 to identify an entry that is the root of a Patricia tree 1110. The Patricia tree has one or more leaves such as 1112, 1114, 1116. Each leaf contains the full SA, DP that hashes to the Direct Table entry as well as one or more DA values that have been observed.

So far the invention has been described using flowcharts. An alternate way of presenting the algorithms used in this invention follows:

The 16 bits (or so) of the hash of SA, DP are used as an index in a Direct Table (DT). DT slots are normal FM slots and can point to no leaf, exactly one leaf, or to a tree with branches and two or more leaves. Each leaf compares the full packet SA, DP to an exact pattern of SA, DP. Again, a leaf contains SA, DP as its label and at least one and possibly several DAs.

If upon computation of the hash value for an SA, DP combination it happens that the slot in the DT is empty (points to nothing), then the DT slot is revised to point to a new leaf with label SA, DP and content DA. Else, if the SA, DP slot in the DT has a pointer, then follow it to a leaf or tree. If the slot points to a tree, then this entails testing certain bits in SA, DP until at most one previously seen leaf can possibly fit the SA, DP. In either case, the full SA, DP in the key and the full SA, DP in the leaf are compared. If they are not equal, then the tree must be rebuilt to test for bits in SA, DP to distinguish the new key from previously seen keys. If they are equal, then the leaf truly corresponds to the key and the DA value of the key is compared to the one or several DA values stored in the leaf. If the DA value of the key is the same as a previously stored DA, then do nothing. Else, add the DA value of the key to the one or more DA values stored in the leaf. Also compare the new total number of DA values with a threshold. If the number is greater than the threshold identify packet as containing virus.

Following are the search acts in the DETECTION ALGORITHM of the invention include the following subprograms expressed in pseudocode.

Detection

0. A next packet arrives.

1. If the packet is not TCP, then goto DETECTION.

2. If the packet is not SYN, then goto DELETION.

3. If the DP of a packet is in a Permissive list, then goto DETECTION.

4. The SA, DP combination (key) from the headers of the packet are fed to a hash function.

5. The hash value is used as an index into a Direct Table slot.

6. If the slot has no pointer (there is no current session with SA, DP that hash to the slot), then goto INSERTION ON DT step 0.

7. If the slot points to a tree (with two or more leaves), then goto 13.

8. If the slot points to (exactly) one leaf, compare the SA, DP with that of the leaf.

9. If the SA, DP of the key and the leaf do not match, goto INSERTION NEW TREE step 0.

10. Else, compare sequentially the DA of the packet with the one or more DA values in the leaf.

11. If the DA of the packet and some DA of the leaf are equal, then goto 0.

12. Else, store the new DA in the leaf. Goto THRESHOLD.

13. Perform bit-test branches in the tree on SA, DP of the key until a leaf is reached.

14. If the SA, DP of the key and leaf do not match, goto INSERTION LARGER TREE step 0.

15. Else, compare sequentially the DA of the packet with the one or more DA values in the leaf.

16. If the DA of the packet and some DA of the leaf are equal, then goto 0.

17. Else, store the new DA in the leaf. Goto THRESHOLD.

Insertion on DT

0. Create a pointer from the DT slot to a new leaf which has SA, DP as label and stores DA.

1. Goto DETECTION.

Insertion New Tree

0. Create a new tree with root equal the DT slot and one branch.

1. Find first bit in the two concatenations of the two SA, DP combinations in which they differ.

2. Use that bit in a bit-test branch to the two leaves, one leaf is the original and the other is added that has label the new SA, DP and stores the DA of the new key.

3. Goto DETECTION.

Insertion Larger Tree

0. Use conventional Patricia tree algorithm to insert a new bit test branch, add one leaf.

1. The new leaf has the SA, DP of the new key as label and stores the DA.

3. Goto DETECTION.

Threshold

0. If the new number of DAs in the leaf is thereby above a threshold T, then REPORT the possibility of malicious traffic from the SA.

1. Goto DETECTION.

Deletion

1. Increment frame counter by 1.

2. Compare frame counter value to a threshold.

4. If the frame count is less than or equal to a threshold, then goto DETECTION.

5. If frame counter value exceeds the threshold, then delete all leaves and trees from the DT.

6. Reset the frame count to zero.

7. Goto DETECTION.

In an alternative embodiment, the count can be time intervals instead of frames, that is, Deletion 1. Increment time counter by 1.

2. Compare time counter value to a threshold.

4. If the time count is less than or equal to a threshold, then goto DETECTION.

5. If time counter value exceeds the threshold, then delete all leaves and trees from the DT.

6. Reset the time count to zero.

7. Goto DETECTION.

3. Reporting Algorithm

Upon receiving a REPORT from the detection mechanism, the present invention can react with one of the following Responses:

1. Alert an administrator who then might investigate the traffic with given SA, SP, DA, or DP for possibly malicious intent.

2. Add the DP=slot value to the list of Permissive DPs.

3. Drop all subsequent packets with the same SA, DA, DP

4. Alternatively, drop all subsequent packets with the same SA

5. A combination of Responses 1, 2, 3, 4 that may change with time.

One of the many benefits provided by the present invention is that the detection is done dynamically and in real time. As a consequence unauthorized snooping may be detected and corrective action is taken before harm is done to devices on the network.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teaching and advanced use of this invention. Accordingly, all such modifications are intended to be included within the scope of this invention as defined in the claims.

The invention claimed is:

1. A method to detect harmful packets on a computer network, the method including:
    providing at least one algorithm that scans received packets;
    identifying packets having a predefined format including a single Source Address (SA), N Destination Addresses (DAs), and M Destination Ports (DPs), wherein N> (greater than) M;
    wherein the SA, DP, and many DAs are stored in a leaf of a Patricia Tree arrangement, and wherein the Patricia Tree arrangement includes a Direct Table;
    indexing into a slot of the Direct Table utilizing a hash value of SA and DP of a predefined packet;
    if the slot has no entry, inserting a pointer in said slot;
    if the slot contains information pointing to a single leaf:
        comparing leaf SA, DP with SA, DP in a predefined packet;
        if a match occurs on SA, DP, comparing the DA in the leaf with the DA in the predefined packet; and
        if no match occurs, adding the DA of the predefined packet to the list of DAs in the leaf;
    reporting said packets to a central administrative authority, which authority includes functionality for taking decisive actions to limit harmful effects of said packets, wherein the decisive actions include:
        adding Destination Port, DP, of said packets to a list of Permissive DPs;
        dropping all subsequent packets having the same SA, DA and DP as an identified packet; and
        rate limiting the set of all subsequent packets with the same SA;
    providing a list of Permissible DPs;
    comparing a DP in the identified packet with the list of Permissible DPs; and
    discarding the identified packet having a matching DP.

2. The method of claim 1, wherein N>8 and M=1.

3. A system to detect packets containing harmful code in a computer network, the system comprising:
    a Network Processor including memory and at least one processing element;
    a data structure including at least one Patricia Tree arrangement storing at least one rule with bit pattern similar to that of a packet carrying harmful code located within said memory;
    a computer program deployed on said at least one processing element and when executed causing said processing element to:
        generate keys from predefined fields in predefined packets;
        correlate the key with the rule to identify packets having a single SA (Source Address), a single DP (Destination Port) and many DAs (Destination Addresses);
        wherein the SA, DP and many DAs are stored in a leaf of a Patricia Tree arrangement, and wherein the Patricia Tree arrangement includes a Direct Table;
        index into a slot of the Direct Table utilizing a hashed of SA and DP of a predefined packet;
        if the slot has no entry, insert a pointer in said slot; and
        if the slot contains information pointing to a single leaf:
            compare leaf SA, DP with SA, DP in predefined packet;
            if a match occurs on SA, DP, compare the DA in the leaf with the DA in the packet; and
            if no match occurs, add the packet DA is to the list of DAs in the leaf.

4. The method of claim 1 wherein the at least one algorithm is executed on a system operatively coupled to said computer network.

* * * * *

UNITED STATES PATENT AND TRADEMARK OFFICE
CERTIFICATE OF CORRECTION

PATENT NO. : 7,669,240 B2
APPLICATION NO. : 10/896680
DATED : February 23, 2010
INVENTOR(S) : Boulanger et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1579 days.

Signed and Sealed this

Seventh Day of December, 2010

David J. Kappos
*Director of the United States Patent and Trademark Office*